(12) United States Patent
Schildt et al.

(10) Patent No.: US 10,417,216 B2
(45) Date of Patent: Sep. 17, 2019

(54) DETERMINING AN INTERSECTION BETWEEN KEYS DEFINING MULTI-DIMENSIONAL VALUE RANGES

(71) Applicant: SAP SE, Walldorf (DE)

(72) Inventors: Christopher Schildt, Walldorf (DE); Cornelia Kinder, Walldorf (DE)

(73) Assignee: SAP SE, Walldorf (DE)

(*) Notice: Subject to any disclaimer, the term of this patent is extended or adjusted under 35 U.S.C. 154(b) by 458 days.

(21) Appl. No.: 14/946,660

(22) Filed: Nov. 19, 2015

(65) Prior Publication Data

US 2017/0147623 A1     May 25, 2017

(51) Int. Cl.
    *G06F 16/23*     (2019.01)
    *G06F 16/2455*     (2019.01)

(52) U.S. Cl.
    CPC .... *G06F 16/2365* (2019.01); *G06F 16/24556* (2019.01)

(58) Field of Classification Search
    CPC ......... G06F 17/30371; G06F 17/30489; G06F 16/2365; G06F 16/24556
    USPC ........................................................ 707/700
    See application file for complete search history.

(56) References Cited

U.S. PATENT DOCUMENTS

| | | | | |
|---|---|---|---|---|
| 5,926,652 A | * | 7/1999 | Reznak | G06F 17/30985 707/999.006 |
| 6,473,763 B1 | * | 10/2002 | Corl, Jr. | G06F 17/30985 |
| 6,594,655 B2 | * | 7/2003 | Tal | G06F 17/30961 707/797 |
| 6,694,482 B1 | | 2/2004 | Arellano et al. | |
| 2005/0039036 A1 | * | 2/2005 | Eisen | G06F 17/30286 713/193 |
| 2009/0193046 A1 | * | 7/2009 | Desai | G06F 17/30315 |
| 2010/0169289 A1 | * | 7/2010 | Newport | G06F 9/466 707/705 |

* cited by examiner

*Primary Examiner* — Robert W Beausoliel, Jr.
*Assistant Examiner* — Pedro J Santos
(74) *Attorney, Agent, or Firm* — Mintz Levin Cohn Ferris Glovsky and Popeo, P.C.

(57) ABSTRACT

Key values can be defined at design time (e.g. in a DTTI object) using character strings that include wildcard characters that define multi-dimensional key ranges. Wildcard characters can designate that a single variable character is to be inserted or that a range from zero to multiple characters can be inserted. The use of wildcards can make checks for key intersection non-trivial. During run time, the key values to be accessed from one or more tables are evaluated, and the operation proceeds. An error can occur if the presence of one or more wildcards in two key value strings used in an aggregation operation result in an overlap such that a same record is included more than once.

20 Claims, 6 Drawing Sheets

```
{
"format_version": 1,
"imports": [{
    "target_table" : "sap::THE_TABLE",
    "source_data" : {
        "file_name": "sap.data::data.csv",
        "data_type": "CSV",
        "has_header": true
    },
    "import_settings": {
        "include_filter": [{
            "KEY": "A"
        }],
        "import_columns": ["FIELD","KEY"]
    }
}]
}
```

FIG. 2A

```
target_table="SYSTEM"."people"
source_data="peopleData.csv"
keys= ["name"="A%" , birthplace="Berlin"]
```

DETERMINING AN INTERSECTION BETWEEN KEYS DEFINING MULTI-DIMENSIONAL VALUE RANGES

TECHNICAL FIELD

The subject matter described herein relates to determining an intersection between multi-dimensional value ranges defined by keys in data or property imports, such as, for example, data or property imports activated by design time table import objects.

BACKGROUND

A database deployment infrastructure can be a service layer of a database management system that simplifies the deployment of database objects by providing a declarative approach for defining database objects (e.g. as design time artifacts) and ensuring a consistent deployment into the database, based on a transactional all-or-nothing deployment model and implicit dependency management. Such an approach can leverage capability of modern high-speed database management systems (DBMSs), such as for example the HANA in-memory DBMS available from SAP SE of Walldorf, Germany.

In-memory database management systems (IM-DBMS) can provide very high performance relative to disk-based approaches. This performance can enable the use of on-demand table aggregation operations (e.g. joins, unions, etc.) to respond to database queries, business intelligence operations, or the like. An aggregation operation generally involves combining data from multiple tables in the database or from multiple locations in a table via a join or union.

Additionally, using various customization-enabling integrated development environment (IDE), such as for example the HANA Studio available for use with the HANA IM-DBMS (available from SAP SE of Walldorf, Germany), a user may create information models, tables, landscapes, etc. on a different system or system than that on which a DBMS is executed. Transport of data from the database to the other systems can be accomplished using a design time table import (DTTI) object rather than requiring recreation of an entire table or set of tables in the target system.

Avoidance of duplication of data records in such operations can be a concern. For example, key values are generally used to designate which records are to be aggregated or transported via one or more DTTI objects. It can be necessary to ensure that the key values designating records to be used in the aggregation operation do not specify a same record more than once.

SUMMARY

Aspects of the current subject matter can include determining an intersection between multi-dimensional value ranges defined by keys in data or property imports, such as, for example, data or property imports activated by design time table import (DTTI) objects.

In one aspect, a method includes receiving a request to import a plurality of key-designated values at runtime, with at least a first key definition and a second key definition defining the plurality of key-designated values. The method further includes identifying a wildcard character positioned after a first part of the first key definition, with the first part comprising at least one character and beginning at a first front end of the first key definition and ending at a character immediately preceding the wildcard character. The method further includes evaluating whether the first part of the first key is equivalent to a second part of the second key. The second part begins at a second front end of the second key definition and is equal in length to the first part. The method further includes determining, based on the evaluating, a match scenario or a no match scenario between the first key definition and the second key definition. The match scenario includes the first key definition and the second key definition being resolvable to both include a same value and the no match scenario includes the first key and the second key being resolvable only to include different values. The determining results in the no match scenario when the first part and the second part are not equivalent. The method further includes activating, when the no match scenario is determined, the import of the plurality of key-designated values.

In optional variations, one or more of the following features can be included in any feasible combination. The wildcard character can include a single-character wildcard that defines a single character. The determining can result in the match scenario when the first part and the second part are equal, the first key definition and the second key definition are of a same length, and deletion of the wildcard from the first key definition and a similarly positioned character from the second key definition results in the first key definition and the second key definition being identical. The wildcard character can define zero, one, or a plurality of characters. The evaluating can further include evaluating whether a third part of the first key is equivalent to a fourth part of the second key when the first part is evaluated to be equivalent to the second part, the third part includes at least one character and beginning at a first back end of the first key definition, and the fourth part beginning at a second back end of the second key definition and being of equal length to the third part. The determining can result in the match scenario when the third part is evaluated to be equivalent to the fourth part. The method can further include transmitting, when the match scenario is determined, an error associated with at least one of the request and the match scenario for presentation at a user interface.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An example of a design artifact can include a design time table import (DTTI) object, which can define the import of data from one or more database tables, for example from a comma separated values (CSV) file, a properties file, or the like. Values or properties to be imported can be designated by key values. A key value can in some examples be a tuple that includes a column name and a value (only rows exactly matching the key are inserted in the table). There is a need to avoid inserting the same values more than once in an imported table or other object resulting from activation of a design time artifact. An overlap of imported values at runtime can create one or more problems. For example, if a value or property is imported twice, operations by an application working with the imported values or properties may not be properly written back to the underlying data or properties maintained by the DBMS. To avoid overlap, it can be necessary to ensure that value ranges defined by keys in one or more DTTI objects do not intersect. Such a check can be relatively straightforward for fixed keys.

In some examples, however, key values can be defined at design time (e.g. in a DTTI object) using character strings that include wildcard characters that define multi-dimensional key ranges. Wildcard characters can designate that a single variable character is to be inserted (e.g. using an underscore "_") or that a range from zero to multiple characters can be inserted (e.g. using a percent sign "%", asterisk "*", or the like). The use of wildcards can make checks for key intersection non-trivial. During run time, the key values to be accessed from one or more tables are evaluated, and the operation proceeds. An error can occur if the presence of one or more wildcards in two key value strings used in an aggregation operation result in an overlap such that a same record is included more than once.

Implementations of the current subject matter include features relating to activating one or more design time table import (DTTI) objects that include a plurality of key definitions and analyzing the key definitions to ensure that the data imported using the one or more key definitions does not include data overlaps (e.g. because two key ranges designate one or more same data values, properties, etc. from underlying tables managed by a DBMS). By comparing key definitions, overlapping imports can be prevented. Comparison of such keys can be done via runtime, such as part of an activation process.

By analyzing the plurality of keys, a match scenario and a no match scenario between the first key and the second key can be evaluated. For example, in the match scenario, a first key and a second key can either explicitly or implicitly include a same value. In the no match scenario, the first key and the second key do not have a same value, either explicitly or implicitly. As used herein, the term explicit refers to a situation in which both key definitions being evaluated include a fixed string and no consideration of wildcards is required as well as to a situation in which both key definitions include wildcards at a same position and in which the other, non-wildcard characters in a string are identical between the two key definitions. An implicit match is one in which either or both of the first and second key definitions includes one or more wildcards and the one or more wildcards can possibly be resolved in a manner to cause a first set of key values specified by the first key definition to include at least one key value that also appears in a second set of key values specified by the second key definition.

Under the no match scenario, none of the above matches (e.g. either explicit or implicit) occurs such that activating the one or more DTTI objects containing the plurality of key definitions will not result in overlap of the imported values.

If the analysis indicates that evaluation of the first and second keys at runtime would result in a match scenario (i.e. that the key values specified resolve to an overlap of at least one value), an error is returned indicating that at least one of the DTTI objects must be revised. In addition, when an error occurs, an activation associated with the DTTI object will not allowed to be made, thus the activation will fail.

As noted above, a DTTI object can contain a key definition that defines one or more key values that can be imported from a data source. The key can act similar to a data filter to ensure that the desired data are imported. In some implementations, the key can include one or more of a letter, digit, and wildcard character (e.g., "%", "_", etc.). In addition, various wildcard characters can be included in a key, such as a wildcard character that functions as a placeholder for a single character (e.g., "_") or for a string of zero to many characters (e.g., "%" or "*"). As such, a single-character wildcard can indicate a single character that allows a match scenario and a character range wildcard can indicate zero or at least one character that allows a match scenario.

The presence of a wildcard in a key definition can result in the key being resolvable to a multi-dimensional range, which can complicate the determination of those keys whose definitions may result in import of key values that overlap with those of other keys. Implementations of the current subject matter can provide a simplified and effective way to determine such overlap between keys, including one or more that contain a wildcard.

Figure 1A:
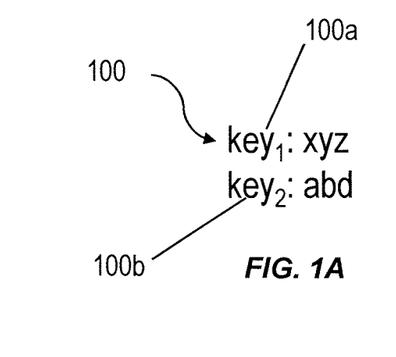
FIG. 1A shows a diagram illustrating a first key of a first design time table import (DTTI) object compared to a second key of a second DTTI object.
Figure 1B:
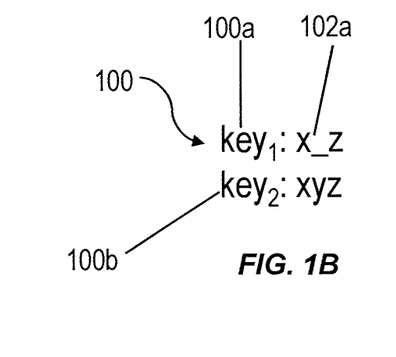
FIG. 1B shows a diagram illustrating a first key of a first DTTI object having a single-character wildcard compared to a second key of a second DTTI object.
Figure 1C:
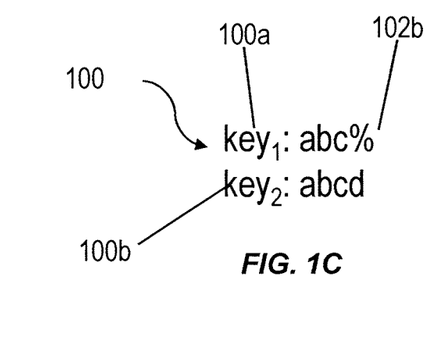
FIG. 1C shows a diagram illustrating a first key of a first DTTI object having a range wildcard compared to a second key of a second DTTI object.
Figure 2A:
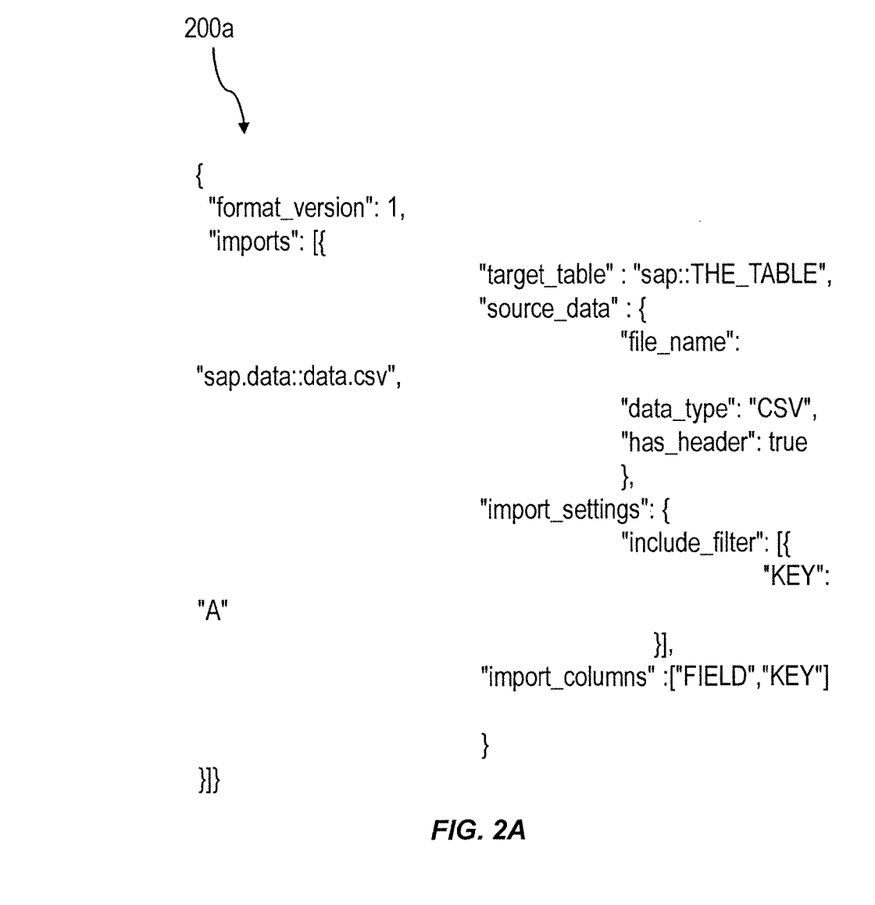
FIG. 2A shows a first example of a design time table import.
Figure 2B:
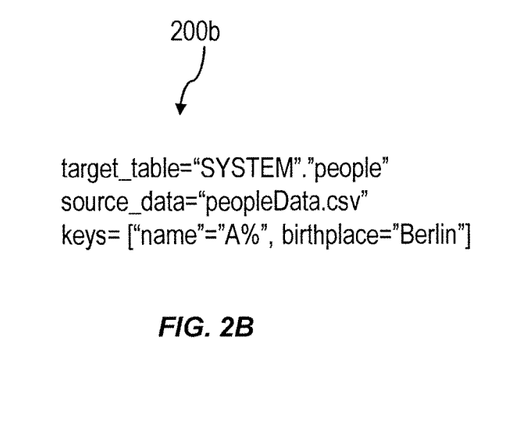
FIG. 2B shows a second example of a design time table import.

FIGS. 1A-1C illustrate various examples of key definitions that can be contained within a DTTI object or other functionality for importing data values, properties or the like to define one or more data values, properties, etc. via one or more key values. In addition, FIG. 2A illustrates a first example of a design time table import 200a and FIG. 2B illustrates a second example of a design time table import 200b.

FIG. 1A shows a diagram illustrating a first key definition 100a compared to a second key definition 100b. In some examples, the first key definition and second key definition can be specified at design time, for example as part of a first and a second DTTI object, respectively. Alternatively, a first key definition 100a and a second key definition 100b can be part of a same DTTI object or some other design time data structure.

In FIG. 1A, the first key definition 100a and the second key definition 100b both include three letters, with each key definition 100a, 100b including different letters defining different values. There are no wildcards or other variables in this example, so the key definitions resolve to explicit key values that can be readily compared to determine whether an overlap occurs. As such, a database system configured to implement the features recited herein, such as at a calculation engine of the database system, or alternatively a key intersection checking module or other functionality implemented on one or more processors, can determine that the first key definition 100a and the second key definition 100b result in a no match scenario in that they do not resolve to overlapping key values.

FIG. 1B shows a diagram illustrating another example of a first key definition 100a having a single-character wildcard 102a (i.e., "_") compared to a second key 100b that does not include a wildcard character. Functionality configured to implement the features recited herein can determine whether the first key definition 100a and the second key definition 100b result in a no match scenario or a match scenario. To do so, the database system (or a component of the database system, such as for example the calculation engine, which is discussed in more detail below, a key intersection checking module, etc.) can compare the strings associated with the first key definition 100a and the second key definition 100b. When comparing the strings and the single-character wildcard 102a is encountered, the position along the string at which the single-character wildcard 102a in the first key definition 100a is located can be skipped in the string of the second key definition 100b. As such, the position in the second key definition 100b that has the same position at which the single-character wildcard 102a is located in the first key definition 100a is not considered when comparing the two key definitions 100a and 100b. If both key definitions 100a and 100b have the same string length, as they do in FIG. 1B (i.e., three character strings), then the two strings are compared to determine if there are any other differences. If no other differences between the strings of the first and second key definitions 100a and 100b exist, then the first key definition 100a and the second key definition 100 define at least one overlapping value. As such, activation of one or more objects including keys having the first key definition 100a and the second key definition 100b results in a match scenario. A similar analysis can proceed with any number of single character wildcards in with key—a character at the same position in the other key is omitted from the comparison as it is assumed that the single character wildcard can be resolved to match that character (or any other character).

FIG. 1C shows a diagram illustrating a first key definition 100a having a character range wildcard 102b compared to a second key definition 100b that does not include a wildcard character. A database system or other machine configured to implement the features recited herein can determine whether activation of one or more objects that include the first key definition 100a and the second key definition 100b results in a no match scenario or a match scenario.

Each key can be evaluated starting from a front of the key (i.e., starting with the first character in the string defining the key) and can continue to the back of the key (i.e., the last character in the string defining the key). If a single character wildcard is found when evaluating a key, then a comparison in key length is made between the key and other keys of interest and the analysis proceeds as outlined above in reference to FIG. 1B. However, if a character range wildcard is found when evaluating a key, comparisons of parts of the keys can be made. For example, with a character range wildcard located in a first key, a first part of the first key beginning from the front end and preceding a first character range wildcard can be compared to a second part of a second key, where the first and second part have a same number of characters (e.g. a number of characters equal to the number of characters occurring before the first character range wildcard in whichever key has a character range wildcard occurring closest to its beginning) and both begin from the front end of their respective keys. If the first part and second part are determined to be equal, a third part of the first key and a fourth part of the second key can be evaluated, where the third and fourth parts are have a same number of characters (e.g. a number of characters occurring after the last character range wildcard in whichever key has a character range wildcard occurring closest to its end) and both begin (when working backwards along each key) at a back end of the respective keys. If the third part and the fourth part are determined to also be equal (e.g. in addition to the first and second parts), the first key and the second key resolve to have overlapping key values (e.g. a match scenario). However, if either the first and second part are determined to not be equal or the third part and the fourth part are determined not to be equal, the first key and the second key resolve to not have overlapping key values (e.g. a no match scenario).

Figure 3:
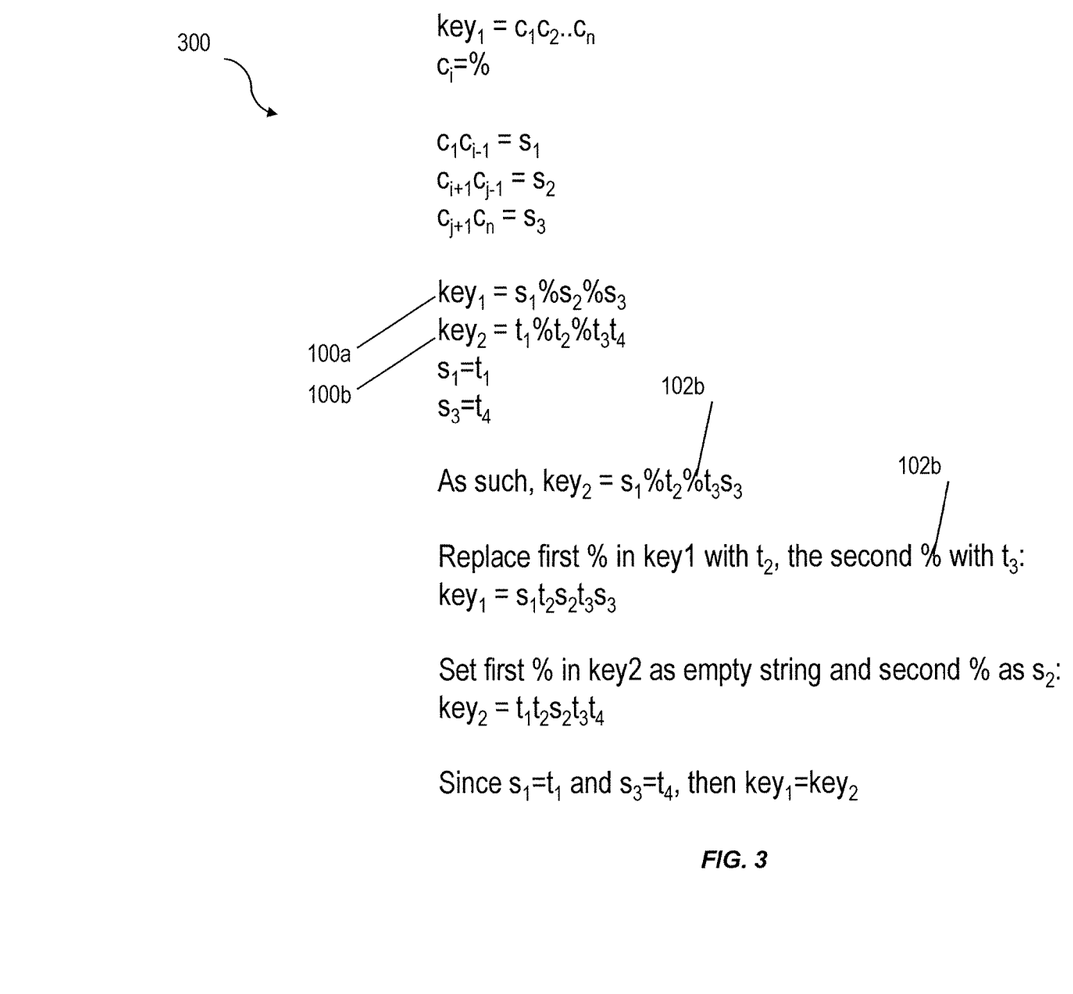
FIG. 3 shows a diagram illustrating calculations related to comparing a first key of a first DTTI object having a range wildcard defining an exact match against a second key of a second DTTI object.

FIG. 3 shows a diagram illustrating calculations 300 related to comparing the first key definition 100a having the character range wildcard 102b against a second key definition 100b that does not contain a wildcard character. As shown in FIG. 2, the string of the first key definition 100a can include a string having an ordered list of characters, such as $key_1$ being equal to $c_1 c_2 \ldots c_n$, with $c_i$ being the first character that is equal to the character range wildcard 102b. If there are more than one character range wildcards, then $c_j$ can be designated as the last character range wildcard. Otherwise, there is only one character range wildcard and i can equal j. As such, the following can be defined:

$$c_1 \ldots c_{i-1} = s_1$$

$$c_{i+1} \ldots c_{j-1} = s_2$$

$$c_{j+1} \ldots c_n = s_3$$

As such, $s_1$ can define a string of one or more characters positioned before the first character range wildcard and beginning at a front end of the first key definition. In addition, $s_2$ can define a string of characters positioned before a last character range wildcard and extending between the first character range wildcard and the last character range wildcard. Additionally, $s_3$ can define a string of characters between the last character wildcard range and the end of the first key. Therefore, $key_1$ can also be defined as $s_1 \% s_2 \% s_3$. It can then be determined whether the first part of the $key_1$ that precedes the first character range wildcard 102b (defined by $s_1$) is equal to a first part of the string of $key_2$ having the same character length as $s_1$ (defined as $t_1$). If it is determined that $s_1$ is equal to $t_1$ and there are no other characters after the character range wildcard 102b in $key_1$, then $key_1$ and $key_2$ overlap. However, if $s_1$ is not equal to $t_1$, then $key_1$ and $key_2$ do not overlap (and no further evaluating needs to be made).

However, if $key_1$ has additional characters in its string that appear after the first character range wildcard 102b, further evaluation is needed if it is determined that $s_1$ is equal to $t_1$. For example, $key_1$ can be evaluated in reverse order (from the back end toward the front end of the key). In this manner, characters at the end of $key_1$ and following at least one first character range wildcard 102b (such as the character string defined as $s_3$) are compared to characters at the end of $key_2$ (such as defined by $t_4$). If it is determined that $s_3$ is also equal to $t_4$, then $key_1$ and $key_2$ overlap. However, if $s_3$ is determined to not be equal to $t_4$, then $key_1$ and $key_2$ do not overlap.

Figure 4:
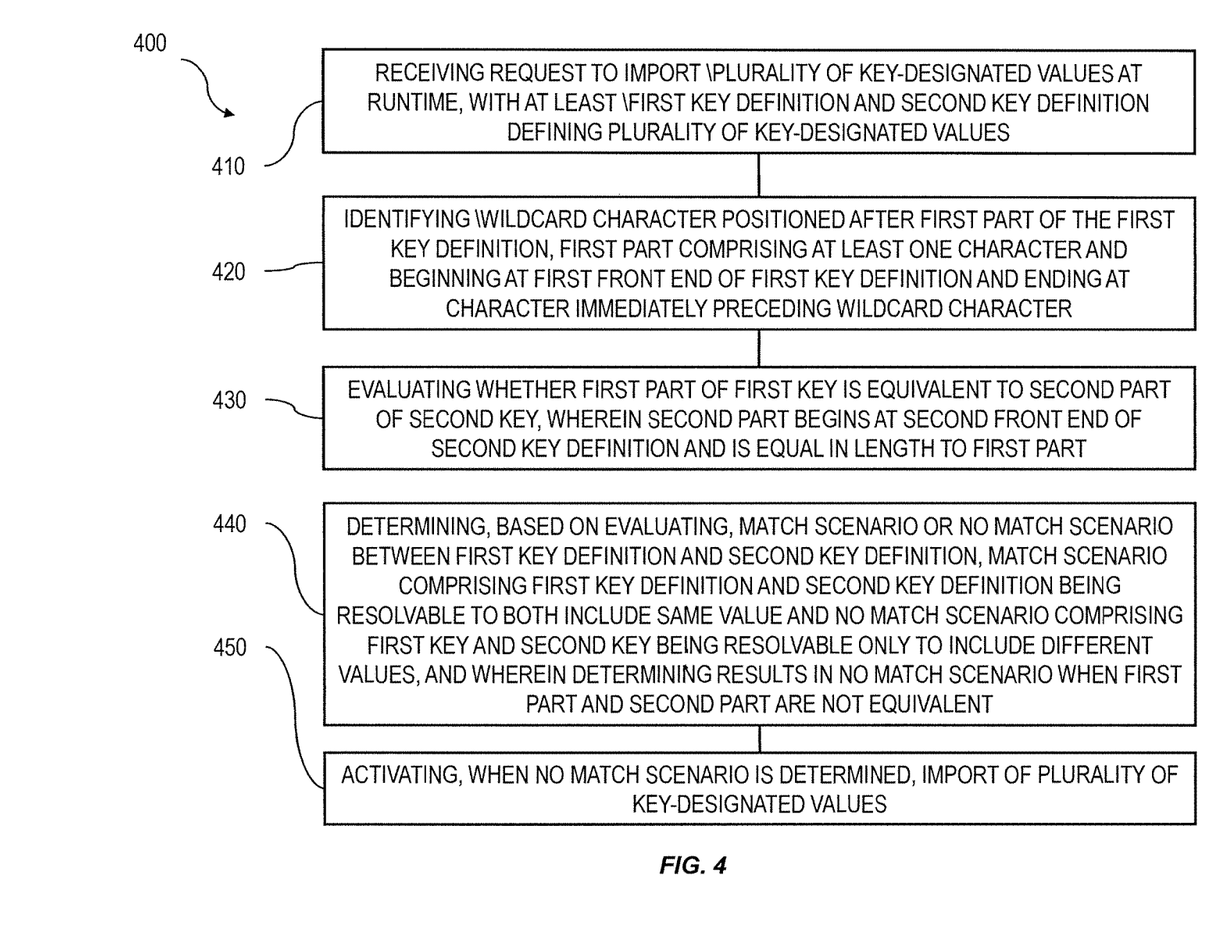
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. It will be understood that other implementations may include or exclude certain features. At 410, a request can be received to import a plurality of key-designated values at runtime, with at least a first key definition and a second key definition defining the plurality of key-designated values. In addition, at 420, wildcard character positioned after a first part of the first key definition can be identified, with the first part comprising at least one character and beginning at a first front end of the first key definition and ending at a character immediately preceding the wildcard character. At 430, whether the first part of the first key is equivalent to a second part of the second key can be evaluated. The second part can begin at a second front end of the second key definition and is equal in length to the first part. At 440, based on the evaluating, a match scenario or a no match scenario between the first key definition and the second key definition can be determined. The match scenario includes the first key definition and the second key definition being resolvable to both include a same value and the no match scenario includes the first key and the second key being resolvable only to include different values. The determining results in the no match scenario when the first part and the second part are not equivalent. At 450, when the no match scenario is determined, the import of the plurality of key-designated values can be activated.

Figure 5:
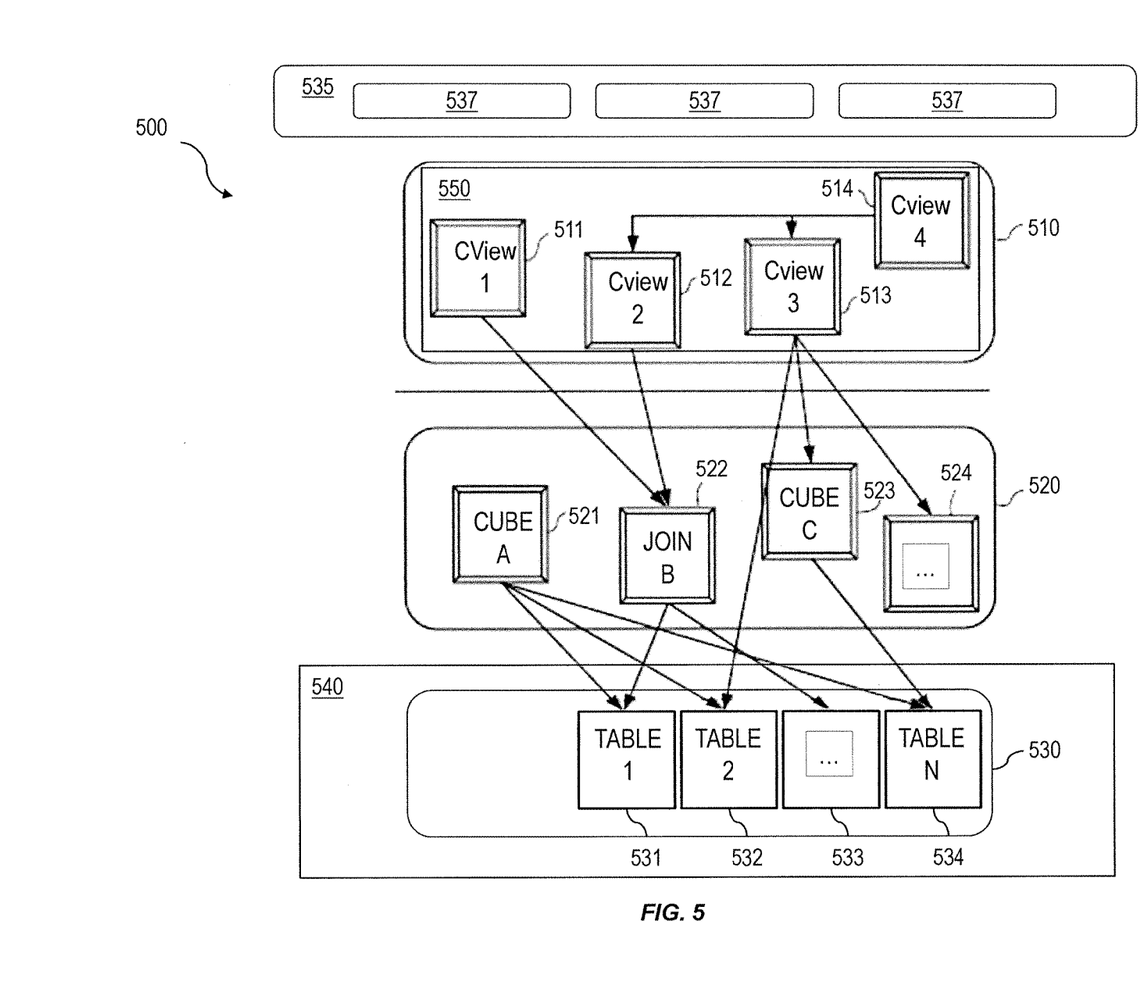
FIG. 5 shows a diagram illustrating a computing architecture including a database system that includes three layers: a calculation engine layer, a logical layer, and a physical table-pool.

FIG. 5 is a diagram that illustrates a computing architecture 500 including a database system that includes three layers: a calculation engine layer 510, a logical layer 520, and a physical table-pool 530. One or more application servers 535 implementing database client applications 537 can access the database system 600. Calculation scenarios can be executed by a calculation engine, which can form part of a database or which can be part of the calculation engine layer 510 (which is associated with the database). The calculation engine layer 510 can be based on and/or interact with the other two layers, the logical layer 520 and the physical table pool 530. The basis of the physical table pool 530 consists of physical tables (called indexes) containing the data, which can be stored on one more database servers 540. Various tables 531-534 can be joined using logical metamodels 521-524 defined by the logical layer 520 to form an index. For example, the tables 531-534 in a cube (e.g. an online analytical processing or "OLAP" index) can be assigned roles (e.g., fact or dimension tables) and joined to form a star schema. It is also possible to form join indexes (e.g. join index B 522 in FIG. 5), which can act like database views in computing environments such as the Fast Search Infrastructure (FSI) available from SAP SE of Walldorf, Germany.

As stated above, a calculation scenario 550 can include individual nodes (e.g. calculation nodes) 511-514, which in turn each define operations such as joining various physical or logical indexes and other calculation nodes (e.g., CView 4 is a join of CView 2 and CView 3). That is, the input for a node 511-514 can be one or more physical, join, or OLAP indexes or calculation nodes.

In a calculation scenario 550, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 550 can be created which can be reused by multiple queries even if such queries do not require every attribute specified by the calculation scenario 550.

Every calculation scenario 550 can be uniquely identifiable by a name (e.g., the calculation scenario 550 can be a database object with a unique identifier, etc.). Accordingly, the calculation scenario 550 can be queried in a manner similar to a view in a SQL database. Thus, the query is forwarded to the calculation node 511-514 for the calculation scenario 550 that is marked as the corresponding default node. In addition, a query can be executed on a particular calculation node 511-514 (as specified in the query). Furthermore, nested calculation scenarios can be generated in which one calculation scenario 550 is used as source in another calculation scenario (e.g. via a calculation node 511-514 in this calculation scenario 550). Each calculation node 511-514 can have one or more output tables. One output table can be consumed by several calculation nodes 511-514.

Figure 6:
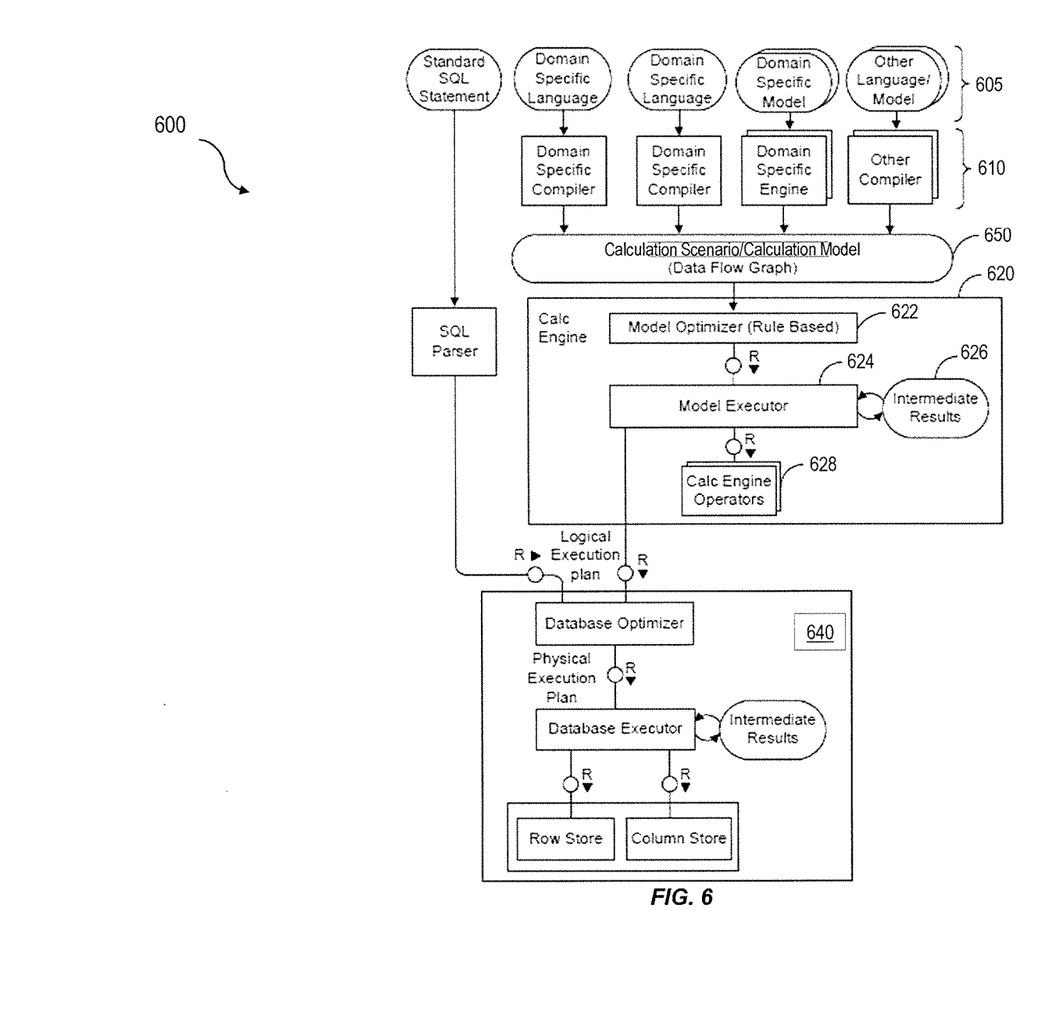
FIG. 6 shows a diagram illustrating a sample architecture for request processing and execution control.

FIG. 6 is a diagram 600 illustrating a sample architecture for request processing and execution control. As shown in FIG. 6, artifacts 605 in different domain specific languages can be translated by their specific compilers 610 into a common representation called a "calculation scenario" 650 (which is also referred to in FIG. 6 as a calculation model). To achieve enhanced performance, the models and programs written in these languages are executed inside the database server 540. This arrangement eliminates the need to transfer large amounts of data between the database server 540 and a client application 537, which can be executed by an application server 535. Once the different artifacts 605 are compiled into this calculation scenario 650, they can be processed and executed in the same manner. A calculation engine 620 executes the calculation scenarios 650.

A calculation scenario 650 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 537 at the application server 535). Inputs can be connected to tables or to the outputs of other nodes. A calculation scenario 650 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 650 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 650 can be defined as part of database metadata and invoked multiple times. A calculation scenario 650 can be created, for example, by a SQL statement "CREATE CALCULATION SCENARIO <NAME> USING <XML or JSON>". Once a calculation scenario 650 is created, it can be queried (e.g., "SELECT A, B, C FROM <scenario name>", etc.). In some cases, databases can have pre-defined calculation scenarios 650 (default, previously defined by users, etc.). Calculation scenarios 650 can be persisted in a repository (coupled to the database server 540) or in transient scenarios. Calculation scenarios 650 can also be kept in-memory.

Calculation scenarios 650 are more powerful than traditional SQL queries or SQL views for many reasons. One reason is the possibility to define parameterized calculation schemas that are specialized when the actual query is issued. Unlike a SQL view, a calculation scenario 650 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 650 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 650. This instantiated calculation scenario 650 is optimized for the actual query and does not contain attributes, nodes or data flows that are not needed for the specific invocation.

When the calculation engine 620 gets a request to execute a calculation scenario 415, it can first optimize the calculation scenario 650 using a rule based model optimizer 622. Examples for optimizations performed by the model optimizer can include "pushing down" filters and projections so that intermediate results 626 are narrowed down earlier, or the combination of multiple aggregation and join operations into one node. The optimized model can then be executed by a calculation engine model executor 624 (a similar or the same model executor can be used by the database directly in some cases). This includes decisions about parallel execution of operations in the calculation scenario 650. The model executor 624 can invoke the required operators (using, for example, a calculation engine operators module 628) and manage intermediate results. Most of the operators are executed directly in the calculation engine 620 (e.g., creating the union of several intermediate results). The remaining nodes of the calculation scenario 650 (not implemented in the calculation engine 620) can be transformed by the model executor 624 into a set of logical database execution plans. Multiple set operation nodes can be combined into one logical database execution plan if possible.

The calculation scenarios 650 of the calculation engine 620 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 620 to execute the calculation scenario 650 behind the calculation view. In some implementations, the calculation engine 620 and the SQL processor are calling each other: on one hand the calculation engine 620 invokes the SQL processor for executing set operations and SQL nodes and, on the other hand, the SQL processor invokes the calculation engine 620 when executing SQL queries with calculation views.

The attributes of the incoming datasets utilized by the rules of model optimizer 422 can additionally or alternatively be based on an estimated and/or actual amount of memory consumed by the dataset, a number of rows and/or columns in the dataset, and the number of cell values for the dataset, and the like.

A calculation scenario 650 as described herein can include a type of node referred to herein as a semantic node (or sometimes semantic root node). A database modeler can flag the root node (output) in a graphical calculation view to which the queries of the database applications directed as semantic node. This arrangement allows the calculation engine 420 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory computer-readable storage medium storing instructions that, when executed by at least one programmable processor, result in operations comprising:
    receiving a request to import a plurality of key-designated values at runtime, wherein the request includes a first key definition and a second key definition, wherein the first key definition and the second key definition define the plurality of key-designated values, wherein the first key definition comprises a first tuple including a first column name and a first key range, wherein the first column name identifies a key column of a first source table, wherein the second key definition comprises a second tuple including a second column name and a second key range, and wherein the second column name identifies a key column of a second source table;
    identifying a wildcard character positioned after a first part of the first key range, the first part comprising at least one character and beginning at a first front end of the first key range and ending at a character immediately preceding the wildcard character;
    evaluating whether the first part of the first key range is equivalent to a second part of the second key range, wherein the second part begins at a second front end of the second key range and is equal in length to the first part;
    determining, based on the evaluating, whether a match scenario exists or a no match scenario exists between the first key range and the second key range, the match scenario comprising the first key range and the second key range being resolvable to both include a same key value, the no match scenario comprising the first key range and the second key range being resolvable to only include different key values; and
    activating, when the no match scenario is determined to exist, the import of the plurality of key-designated values from the first source table and the second source table.

2. The computer program product of claim 1, wherein the wildcard character is a single-character wildcard that defines a single character.

3. The computer program product of claim 2, wherein the determining results in the match scenario when the first part and the second part are equal, the first key range and the second key range are of a same length, and deletion of the wildcard from the first key range and a similarly positioned character from the second key range results in the first key range and the second key range being identical.

4. The computer program product of claim 1, wherein the wildcard character defines zero, one, or a plurality of characters.

5. The computer program product of claim 4, wherein the evaluating further includes evaluating whether a third part of the first key range is equivalent to a fourth part of the second key range when the first part is evaluated to be equivalent to the second part, the third part comprising at least one character and beginning at a first back end of the first key range, the fourth part beginning at a second back end of the second key range and being of equal length to the third part.

6. The computer program product of claim 5, wherein the determining results in the match scenario when the third part is evaluated to be equivalent to the fourth part.

7. The computer program product of claim 1, further comprising:
    transmitting, when the match scenario is determined, an error associated with at least one of the request and the match scenario for presentation at a user interface.

8. A method for implementation by one or more data processors forming part of at least one computing system, the method comprising:
- receiving a request to import a plurality of key-designated values at runtime, wherein the request includes a first key definition and a second key definition, wherein the first key definition and the second key definition define the plurality of key-designated values, wherein the first key definition comprises a first tuple including a first column name and a first key range, wherein the first column name identifies a key column of a first source table, wherein the second key definition comprises a second tuple including a second column name and a second key range, and wherein the second column name identifies a key column of a second source table;
- identifying a wildcard character positioned after a first part of the first key range, the first part comprising at least one character and beginning at a first front end of the first key range and ending at a character immediately preceding the wildcard character;
- evaluating whether the first part of the first key range is equivalent to a second part of the second key range, wherein the second part begins at a second front end of the second key range and is equal in length to the first part;
- determining, based on the evaluating, whether a match scenario exists or a no match scenario exists between the first key range and the second key range, the match scenario comprising the first key range and the second key range being resolvable to both include a same key value, the no match scenario comprising the first key range and the second key range being resolvable to only include different values; and
- activating, when the no match scenario is determined to exist, the import of the plurality of key-designated values from the first source table and second source table.

9. The method of claim 8, wherein the wildcard character is a single-character wildcard that defines a single character.

10. The method of claim 9, wherein the determining results in the match scenario when the first part and the second part are equal, the first key range and the second key range are of a same length, and deletion of the wildcard from the first key range and a similarly positioned character from the second key range results in the first key range and the second key range being identical.

11. The method of claim 8, wherein the wildcard character defines zero, one, or a plurality of characters.

12. The method of claim 11, wherein the evaluating further includes evaluating whether a third part of the first key range is equivalent to a fourth part of the second key range when the first part is evaluated to be equivalent to the second part, the third part comprising at least one character and beginning at a first back end of the first key range, the fourth part beginning at a second back end of the second key range and being of equal length to the third part.

13. The method of claim 12, wherein the determining results in the match scenario when the third part is evaluated to be equivalent to the fourth part.

14. The method of claim 8, further comprising:
- transmitting, when the match scenario is determined, an error associated with at least one of the request and the match scenario for presentation at a user interface.

15. A system comprising:
- computer hardware comprising at least one programmable processor configured to perform operations comprising:
  - receiving a request to import a plurality of key-designated values at runtime, wherein the request includes a first key definition and a second key definition, wherein the first key definition and the second key definition define the plurality of key-designated values, wherein the first key definition comprises a first tuple including a first column name and a first key range, wherein the first column name identifies a key column of a first source table, wherein the second key definition comprises a second tuple including a second column name and a second key range, and wherein the second column name identifies a key column of a second source table;
  - identifying a wildcard character positioned after a first part of the first key range, the first part comprising at least one character and beginning at a first front end of the first key range and ending at a character immediately preceding the wildcard character;
  - evaluating whether the first part of the first key range is equivalent to a second part of the second key range, wherein the second part begins at a second front end of the second key range and is equal in length to the first part;
  - determining, based on the evaluating, whether a match scenario exists or a no match scenario exists between the first key range and the second key range, the match scenario comprising the first key range and the second key range being resolvable to both include a same key value, the no match scenario comprising the first key range and the second key range being resolvable to only include different values; and
  - activating, when the no match scenario is determined to exist, the import of the plurality of key-designated values from the first and second source tables.

16. The system of claim 15, wherein the wildcard character is a single-character wildcard that defines a single character.

17. The system of claim 16, wherein the determining results in the match scenario when the first part and the second part are equal, the first key range and the second key range are of a same length, and deletion of the wildcard from the first key range and a similarly positioned character from the second key range results in the first key range and the second key range being identical.

18. The system of claim 15, wherein the wildcard character defines zero, one, or a plurality of characters.

19. The system of claim 18, wherein the evaluating further includes evaluating whether a third part of the first key range is equivalent to a fourth part of the second key range when the first part is evaluated to be equivalent to the second part, the third part comprising at least one character and beginning at a first back end of the first key range, the fourth part beginning at a second back end of the second key range and being of equal length to the third part.

20. The system of claim 19, wherein the determining results in the match scenario when the third part is evaluated to be equivalent to the fourth part.

* * * * *